United States Patent
Meier et al.

(10) Patent No.: US 7,987,667 B2
(45) Date of Patent: Aug. 2, 2011

(54) GPS-ACTIVATED EXHAUST FILTRATION MONITORING AND CONTROL SYSTEM

(75) Inventors: John Meier, Elmira, NY (US); Cris Pasto, Spencer, NY (US)

(73) Assignee: Meier Diesel Filters, Inc., Elmira, NY (US)

( * ) Notice: Subject to any disclaimer, the term of this patent is extended or adjusted under 35 U.S.C. 154(b) by 841 days.

(21) Appl. No.: 12/018,929

(22) Filed: Jan. 24, 2008

(65) Prior Publication Data

US 2008/0178576 A1    Jul. 31, 2008

Related U.S. Application Data

(63) Continuation-in-part of application No. 11/564,124, filed on Nov. 28, 2006.

(51) Int. Cl.
| | |
|---|---|
| *F01N 3/00* | (2006.01) |
| *F01N 3/02* | (2006.01) |
| *G06F 19/00* | (2011.01) |
| *G06G 7/70* | (2006.01) |
| *G06G 7/76* | (2006.01) |
| *G08G 1/00* | (2006.01) |
| *G01C 21/00* | (2006.01) |

(52) U.S. Cl. ............... 60/324; 60/277; 60/288; 60/297; 60/311; 701/117; 701/207; 701/213

(58) Field of Classification Search .............. 60/277, 60/288, 297, 311, 324; 95/274, 283, 284; 701/117–119, 207–209, 213–216
See application file for complete search history.

(56) References Cited

U.S. PATENT DOCUMENTS

| | | | |
|---|---|---|---|
| 3,972,184 | A | 8/1976 | Warren |
| 4,503,672 | A | 3/1985 | Stark |
| 4,803,838 | A | 2/1989 | Kaeser |
| 4,961,314 | A | 10/1990 | Howe |
| 5,009,065 | A | 4/1991 | Howe |
| 5,024,054 | A | 6/1991 | Barris |
| 5,123,243 | A | 6/1992 | Baddour |
| 5,154,894 | A | 10/1992 | Mac Farlane |
| 5,195,318 | A | 3/1993 | Shinzawa |
| 5,195,323 | A | 3/1993 | Lorts |

(Continued)

FOREIGN PATENT DOCUMENTS

WO    WO 2008140360 A1 * 11/2008

*Primary Examiner* — Thomas E Denion
*Assistant Examiner* — Audrey Klasterka
(74) *Attorney, Agent, or Firm* — Aquilla Patents & Marks PLLC; Thomas T. Aquilla

(57) ABSTRACT

A system for removing particulates from the exhaust gas of a vehicle internal combustion engine, particularly during those times that the emission of such particulates into the atmosphere would be of greatest danger to persons in the vicinity of the vehicle, includes a valve connected to the vehicle exhaust manifold for normally directing exhaust to the atmosphere, when in the non-activated condition. The valve directs exhaust to a particulate filter, when in the activated condition. Starting of the engine activates the valve for a predetermined period of time. The valve optionally is GPS-controlled and can be disabled manually or automatically by a switch, which detects the backpressure in the exhaust system. An exhaust pressure sensor monitors the exhaust backpressure, and a circuit device responsive to the exhaust pressure maintains the valve continuously in the non-activated condition, when the exhaust backpressure reaches a predetermined level for a predetermined period of time.

10 Claims, 5 Drawing Sheets

U.S. PATENT DOCUMENTS

| | | |
|---|---|---|
| 5,212,948 A | 5/1993 | Gillingham |
| 5,357,755 A | 10/1994 | Gillingham |
| 5,373,733 A * | 12/1994 | Fuchs et al. ............ 73/114.76 |
| 5,390,492 A | 2/1995 | Levendis |
| 5,426,936 A | 6/1995 | Levendis |
| 5,519,993 A | 5/1996 | Rao |
| 5,603,216 A | 2/1997 | Guile |
| 5,768,888 A | 6/1998 | Matros |
| 6,499,292 B2 | 12/2002 | Kato |
| 6,712,888 B2 | 3/2004 | Siska |
| 6,820,417 B2 | 11/2004 | May |
| 6,945,120 B1 * | 9/2005 | Marcus et al. ............ 73/756 |
| 6,948,486 B2 | 9/2005 | Oakes et al. |
| 2003/0135323 A1 | 7/2003 | Votsmeier |
| 2004/0194454 A1 | 10/2004 | Rim |
| 2005/0166580 A1 * | 8/2005 | Pfaeffle et al. ............ 60/295 |
| 2009/0044530 A1 * | 2/2009 | Gallagher et al. ......... 60/605.1 |

* cited by examiner

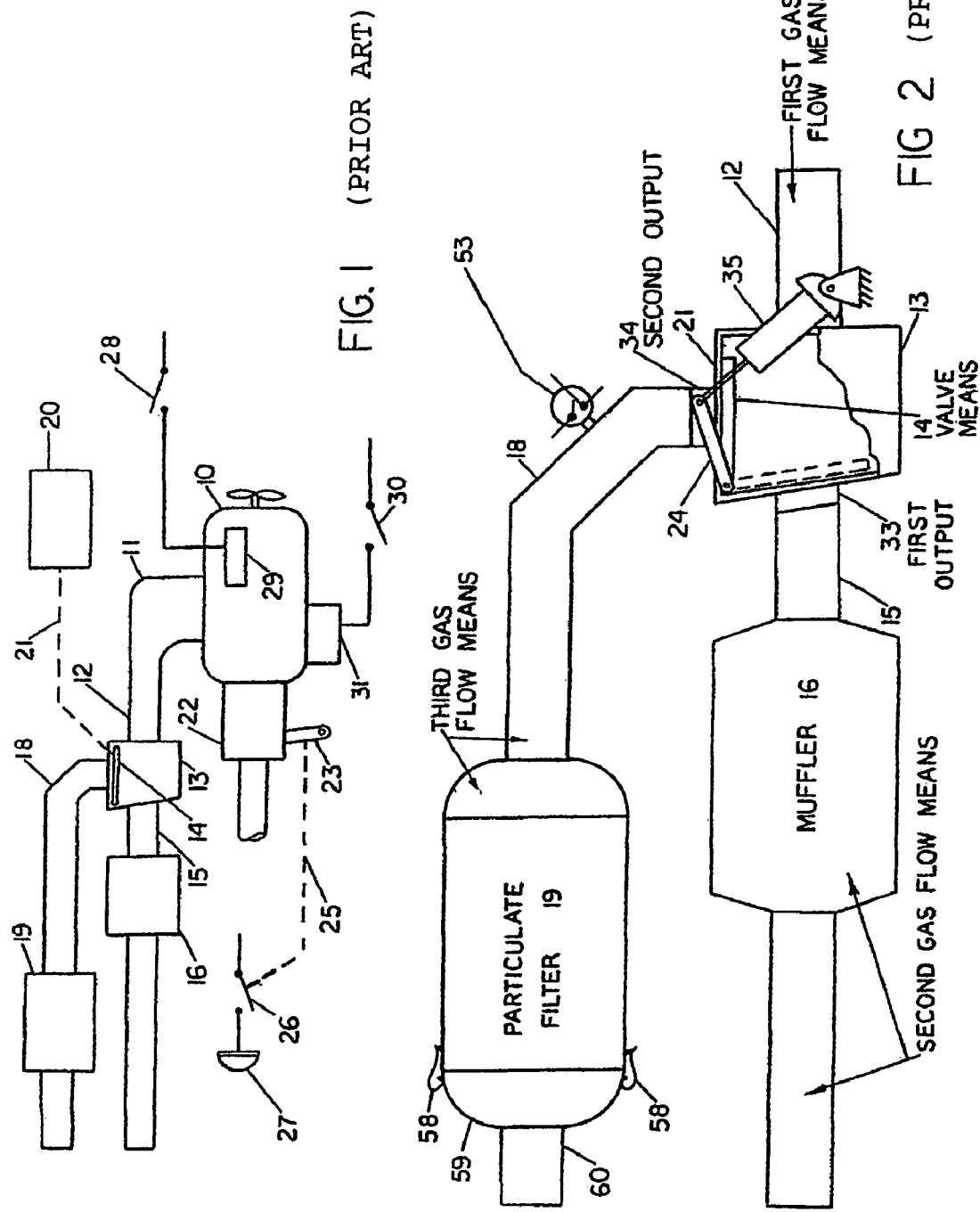

FROM FIG.3B

GPS-ACTIVATED EXHAUST FILTRATION MONITORING AND CONTROL SYSTEM

REFERENCE TO RELATED APPLICATIONS

This is a continuation-in-part patent application of copending application Ser. No. 11/564,124, filed Nov. 28, 2006, entitled "EXHAUST FILTRATION MONITORING AND CONTROL SYSTEM". The aforementioned application is hereby incorporated herein by reference in its entirety.

BACKGROUND OF THE INVENTION

1. Field of the Invention

The invention pertains to the field of internal combustion engine exhaust handling and filtration. More particularly, the invention pertains to a system for the filtration of particulate matter contained in the exhaust gas of diesel engines, including means for monitoring filter backpressure, controlling and by-passing or activating said filtration system automatically and/or on demand.

2. Description of Related Art

Diesel engine exhaust gas contains considerable amounts of exhaust particulates. Various kinds of filters or trapping devices have been employed for removing such particulates. However, a typical diesel engine may emit on the order of a gallon of particulate in 1,000 miles of continuous operation. After a sufficient amount of particulate has been trapped, the resultant backpressure adversely affects the operation of the engine. Vehicles that utilize filter elements for trapping exhaust particulates must therefore employ means for dealing with this problem.

There have been proposed a number of diesel exhaust gas cleaning devices, which include filter regeneration means. For example, disclosed in U.S. Pat. Nos. 4,450,681, 4,485,621 and 4,538,412 are filter regeneration systems comprising various means for igniting and burning the trapped exhaust particulates. Such regeneration systems conventionally include valve means for by-passing at least a portion of the exhaust gas during at least a portion of the regeneration cycle. However, such regeneration techniques generally have been subject to one or more of the following disadvantages, which have precluded the commercial acceptance thereof: (1) an inability of the filter element to undergo regeneration so as to maintain effectiveness over long periods, (2) regeneration can reduce the efficiency of the filter element, (3) regeneration can damage the filter element such as by the generation of corrosive gases, and (4) regeneration can produce excessive amounts of harmful by-products such as sulfates.

U.S. Pat. No. 5,154,894 discloses a catalytic converter for use in the exhaust system of an internal combustion engine, having a rigid outer canister with a catalyst support disposed therein for movement between a first position adjacent in inlet end of the canister and a second position located in spaced relationship with said inlet end. In its first position, the substrate seals the inlet thereby forcing the entire exhaust flow through the fluid flow passages within the catalyst support, which are in axial alignment with the converter inlet. The effect of forcing the totality of flow reduced volume of the substrate to the entire thermal energy of the exhaust stream thereby assisting in a reduction in the catalyst light-off time. Following catalyst light-off, the catalyst support is moved to its second, spaced position in which the entire frontal area of the converter is exposed to the exhaust flow thereby lowering backpressure of the converter and preventing converter over-temperature problems.

U.S. Pat. No. 5,123,243 discloses a method and apparatus for removing solid particulate matter from the exhaust of a diesel engine, which comprises passing the engine's exhaust flow through at least a part of filter means to trap solid particulate matter contained initially in the exhaust, thereby to remove said matter from said exhaust flow, interrupting the exhaust flow through at least said part of the filter means, at a time when the preceding period of exhaust flow therethrough is of sufficiently brief duration that the trapped particulate matter has not become resistant to subsequent combustion in the engine, during said interruption back-flushing at least said part of the filter means thereby to dislodge from the filter means, and entrain, said solid particulate matter for the purpose of removing it from the filter means, and transporting said dislodged solid particulate matter to the intake of said engine, so that said matter can be combusted in the engine.

U.S. Pat. No. 5,024,054 discloses a diesel engine exhaust system including a plurality of valved ceramic filters connected in parallel in the exhaust stream and loaded sequentially. While one filter is preferentially loaded, a second filter is opened to the exhaust stream, when backpressure reaches a predetermined value. The secondary filter is removed from the exhaust stream when air flow to the engine drops a discrete amount below a peak air flow, determined by the backpressure, which would cause the secondary filter to be placed in the exhaust stream. The preferentially loaded filter is bypassed when completely loaded and regenerated. The secondary filter is then preferentially loaded and the sequence continues.

U.S. Pat. No. 5,009,065 discloses an exhaust processor for filtering particulate matter from a combustion product. The exhaust processor includes a partition situated inside a housing to form a first flow passage and a second flow passage in an upstream portion of the housing. A main substrate is mounted in the first flow passage for solid particle filtration. An auxiliary substrate is situated in the second flow passage to filter combustion product passing through the second flow passage during regeneration of the main substrate. A muffler is situated in a downstream portion of the housing and is arranged so that the entire spatial volume of the muffler can be utilized by combustion product passing through either the first or second flow passage.

U.S. Pat. No. 4,538,412 discloses an exhaust particulate cleaning device for a diesel engine, comprising a trap case, which is located in a passageway of the exhaust gas and which has therein a filter material for trapping the exhaust particulates contained in the exhaust gas, an electric heater for igniting and burning the exhaust particulates trapped in the filter material, a larger bypass passage of the exhaust gas bypassing the trap case, and a control valve in the bypass passage for opening and closing the bypass passage.

U.S. Pat. No. 4,503,672 discloses an exhaust cleaner system for use in the exhaust system of a diesel engine with a particulate filter positioned in a trap housing with an exhaust inlet thereto and an exhaust outlet therefrom. A pair of exhaust ducts are positioned in the inlet end of the exhaust outlet whereby to define, in effect, three separate exhaust flow zones through the filter and a flow limiter valve is operatively positioned to sequentially control flow through the exhaust ducts. Glow plugs are located so as to extend into the zones of the filter associated with the exhaust ducts to initiate incineration of particulates during reduced exhaust flow conditions as controlled by the flow limiter valve.

U.S. Pat. No. 4,485,621 discloses a method for removing particulates from internal combustion exhaust gases in a system, which includes a first gas conduit which connects with an engine exhaust pipe and which communicates with a trapping chamber containing means for filtering or trapping particulate matter present in the exhaust gas. A second gas conduit connects with said first gas conduit at a location upstream of the said trapping chamber and leads to a regenerating chamber which contains an electrically conductive substrate which carries an oxidation catalyst. A third gas conduit carries the hot gas from the regenerating chamber and connects with said first gas conduit at a location also upstream of said trapping chamber. The electrically conductive substrate material within the regenerating chamber is part of an electrical circuit and is heated by current passing therethrough. Means are provided for injecting a combustible fuel into the regenerating chamber wherein the fuel-exhaust gas mixture is effectively heated and burned therein and the heated gas then passes into the trapping chamber to incinerate and burn off the particulate collected therein. Valve means are provided to selectively direct exhaust gas flow through to the trapping chamber and the regenerating chamber.

U.S. Pat. No. 4,450,681 discloses a carbon particulates cleaning device, comprising a carbon particulate catching means, a fuel injecting means, a fuel retaining means for retaining the fuel injected by the fuel injecting means near the carbon particulates catching means, a fuel igniting means for igniting the fuel retained by the fuel retaining means, and a gas blowing means which blows gas for maintaining the fuel burning and applying the heat of the burning fuel into the carbon particulates caught by the catching means. The carbon particulates caught by the carbon particulates catching means are effectively burnt and eliminated by supplying gas which is heated due to the burning heat of the fuel ignited by the fuel igniting means.

U.S. Pat. No. 3,972,184 discloses an exhaust system for an internal combustion engine including a catalytic converter. A valve-controlled by-pass around the catalyst bed in the converter is provided, such that the exhaust gas is only passed through the catalyst bed during engine warm-up. The valve is automatically controlled by engine temperature such that after the engine attains operating temperature the by-pass valve opens and the exhaust gas by-passes all catalyst.

U.S. Pat. No. 4,803,838 discloses a device for removing particulates from the exhaust gas of a vehicle internal combustion engine during those times that the emission of such particulates into the atmosphere would be of greatest danger to persons in the vicinity of the vehicle. The system comprises valve means connected to the vehicle exhaust manifold for normally directing exhaust to the atmosphere when in the non-activated condition. The valve means directs exhaust to a particulate filter when in the activated condition. Means responsive to the starting of the engine activates the valve means for a predetermined period of time. The valve means can also be activated by shifting into reverse gear.

However, the device of U.S. Pat. No. 4,803,838 is known to accumulate particulates, in a relatively short time, sufficient to produce enough backpressure to cause its control system to activate the backpressure warning light, indicating that the filter requires service. Thus, this system is prone to false indications that the filter requires service, inducing costly maintenance procedures to be performed unnecessarily. Similarly, an improved version of the system of U.S. Pat. No. 4,803,838 also is known to accumulate particulates, in a relatively short time, sufficient to produce enough backpressure to cause its control system to by-pass the filter (temporarily or intermittently), particularly depending on throttle position, vibration and other factors, thus producing unwanted soot and/or false indications that the filter requires service. Another problem is that, when the backpressure reaches a level sufficient to activate the system, the backpressure warning light in this system merely blinks several times and then goes dark. Because the warning light does not remain lit, vehicle operators frequently forget that the filter requires service.

U.S. Pub. No. 20030135323A1 discloses a method and device for operating an engine of a motor vehicle. Driving condition parameters of the engine and/or the motor vehicle are collected over a predetermined period of time. The probabilities of parameters for the future operation of the engine in relation to the captured driving condition parameters are ascertained, and operating parameters of the engine are adjusted in relation to the ascertained probability values for the parameters. Preferably, navigation signals are read in by external navigator systems, such as GPS systems, to additionally determine the geographical position of the motor vehicle.

The foregoing methods and apparatus for internal combustion engine exhaust handling and filtration generally suffer from numerous problems and limitations. For example, many are inefficient or even ineffective over long periods, or develop backpressure that negatively affects engine performance, while others do not adequately filter the exhaust gasses, particularly when needed to protect the health of individuals located nearby. More particularly, the system described in U.S. Pat. No. 4,803,838 suffers from the problem that, when the filter begins to accumulate particles, the resulting backpressure causes the backpressure warning light to turn on and off intermittently, thus giving false indications of the state of the filter. Even when operating properly, the backpressure warning light merely blinks several times, when activated, and then it goes dark. This results in neglect and less frequent filter maintenance than is desired for efficient operation of the filter system.

Thus there is a need in the art for an exhaust particulate removal system that overcomes the disadvantages of the prior art. More particularly, there is a need for an improved exhaust particulate removal control system that is less prone to false indications that the filter requires service, less likely to produce unwanted soot due to by-passing the filter unnecessarily, and more reliable generally.

SUMMARY OF THE INVENTION

The present invention provides apparatus and methods for removing particulates from the exhaust gas of a vehicle internal combustion engine, particularly during those times that the emission of such particulates into the atmosphere would be of greatest danger to persons in the vicinity of such vehicles. More particularly, the invention provides a system for removing particulates from the exhaust gas of a vehicle internal combustion engine, including means for monitoring filter backpressure, controlling and by-passing or activating said filtration system.

Briefly stated, the invention provides a system for removing particulates from the exhaust gas of a vehicle internal combustion engine, that includes first gas flow means connected to the exhaust of the engine, and valve means connected to the first gas flow means for normally directing exhaust to a first output when in the non-activated condition and for directing exhaust to a second output when in the activated condition. Second gas flow means is connected to the valve means first output for exhausting particulate-containing exhaust to the atmosphere. Third gas flow means is connected to the valve means second output for removing exhaust gas particulates before delivering the exhaust gas to the atmosphere. Means responsive to the starting of the engine activates the valve means for a predetermined period of time after the engine has been started. Means responsive to a second condition within the vehicle also activates the valve means.

The means responsive to a second condition may comprise means activated by shifting the vehicle gear means into reverse gear for activating the valve means while the vehicle is in reverse gear, the valve means remaining activated for the predetermined period of time after the gear means has been shifted out of reverse gear. The vehicle operator can also operate the valve means by closing a switch. Alternative means for activating the valve means include, for example, photo sensors.

In a preferred embodiment, the valve activating means can be disabled by switch means, which detects the backpressure in the exhaust system. In this embodiment, exhaust pressure sensing means monitors the exhaust backpressure, and circuit means responsive to the exhaust pressure sensing means maintains the valve means continuously in the non-activated condition and continuously lights a backpressure warning light, when the exhaust backpressure reaches a predetermined level for a predetermined period of time.

In another embodiment, the circuit means responsive to the exhaust pressure further comprises locking means for disabling other system inputs that normally would activate the valve means (e.g., reverse gear), when the exhaust backpressure reaches a predetermined level for a predetermined period of time.

In yet another embodiment, the valve means is activated based on GPS coordinates that define Exhaust Sensitive Areas (ESA), such that when a GPS navigation system equipped vehicle comes within a predetermined distance of an ESA, the vehicle's on-board Exhaust System Programmable Logic Controller (ES-PLC) diverts the exhaust from bypass to filter mode.

Thus, the present invention provides an exhaust particulate removal system that overcomes the disadvantages of the prior art. More particularly, the invention provides an improved exhaust particulate removal control system that is less prone to false indications that the filter requires service, less likely to produce unwanted soot due to by-passing of the filter unnecessarily, essentially automatic and more reliable generally, and optionally GPS-activated. These and other features and advantages will become readily apparent from the following detailed description, which should be read in conjunction with the accompanying drawing figures.

BRIEF DESCRIPTION OF THE DRAWINGS

FIG. 1 shows a schematic view of an engine provided with a system for removing exhaust gas particulates in accordance with the prior art.

FIG. 2 shows a schematic view showing a preferred system for purifying exhaust gases in accordance with the prior art.

DETAILED DESCRIPTION OF THE INVENTION

Figure 3A:
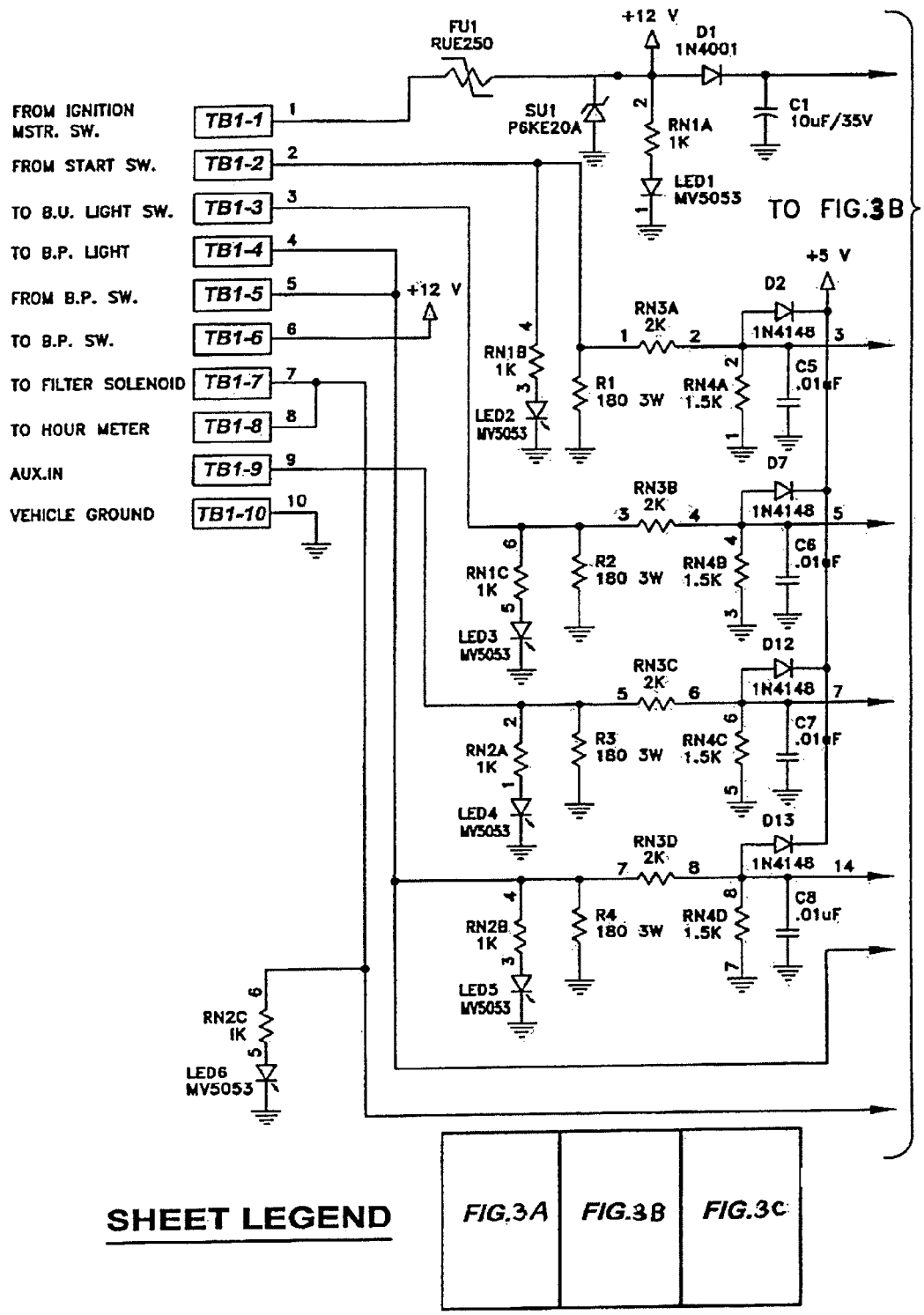
FIGS. 3A-3C show a schematic diagram of a control system for activating the exhaust diverter valve of FIG. 1, according to an embodiment of the present invention.

The following description relates to certain exemplary embodiments of a system for removing solid particulates contained in the exhaust gas of diesel engines, according to the present invention. It will be readily apparent that numerous variations and modifications, other than those specifically indicated, will be readily apparent to those of sufficient skill in the field. In addition, certain terms are used throughout the discussion in order to provide a convenient frame of reference with regard to the accompanying drawings. These terms are not intended to be specifically limiting of the invention, except where so indicated in the claims.

The invention provides a system for removing particulates from the exhaust gas of a vehicle internal combustion engine, particularly during those times that the emission of such particulates into the atmosphere would be of greatest danger to persons in the vicinity of such vehicles. The invention provides an improvement over similar devices known in the art, and is particularly adapted and well suited for controlling the type of exhaust filtration system described in U.S. Pat. No. 4,803,838, the complete disclosure of which is hereby incorporated herein by reference in its entirety. The present invention is thus herein described with specific reference to the prior art apparatus with which the invention is intended or expected to be used, with the understanding that the invention can be used to advantage in various other filtration systems as well, and is not limited to the specific embodiments described herein.

Referring now to FIGS. 1-2, an exhaust filtration system is shown, as previously described in U.S. Pat. No. 4,803,838. As shown in FIG. 1, exhaust manifold 11 of diesel engine 10 is connected to a first gas flow conduit 12. Whereas a diesel engine is specifically described herein, the present invention is also useful in connection with other engines. For example, a gasoline engine having worn rings may exhaust a sufficient amount of particulate matter to warrant use of this system. Changeover valve 14 is located in housing 13, which is connected to conduit 12. The valve normally connects exhaust gas to second exhaust gas conduit 15, in which muffler 16 is located. When in the activated condition, valve 14 switches the exhaust gas flow to third gas flow conduit 18, in which filter or particulate catching means 19 is located. Dashed line 21 indicates the mechanical connection between valve 14 and valve actuating means 20.

Attached to engine 10 is transmission 22, from which control lever 23 extends. Dashed line 25 represents a mechanical connection between lever 23 and backup switch 26, which activates backup light 27, when transmission 22 is shifted into reverse. Switch 28 connects battery voltage to engine ignition system 29, and starter switch 30 connects battery voltage to starter 31.

Referring to FIG. 2, gas conduit 12 is connected to changeover valve housing 13 having a first outlet passage 33 and a second outlet passage 34. Outlet passage 33 is connected to muffler 16 by conduit 15, and outlet passage 34 is connected to particulate filter 19 by gas conduit 18. Disposed within housing 13 is a valve 14, which is shown in its normal position, whereby gas from conduit 12 exits from outlet passage 33. Activation of air cylinder 35 pulls lever 24, thus causing valve 14 to move to its activated position shown by dashed lines, whereby gas from conduit 12 exits from outlet passage 34. It is noted that air cylinder plunger rod 21 is represented by the dashed line mechanical connection in FIG. 1.

An air tank (not shown) supplies air to solenoid valves (not shown), which control the flow of air to opposite ends of air cylinder 35. One valve is a three way normally closed valve, and the other valve is a three way normally open valve. Thus, air cylinder plunger rod 21 is normally extended. This places valve 14 in its normal position shown in FIG. 2. The cylinder 35 constitutes valve activating means 20 of FIG. 1. Although an air cylinder-operated changeover valve may be advantageous on trucks that already contain compressed air tanks, other suitable activating means, such as an electrically powered system, optionally is employed.

The electrical control system, the output of which controls valve activating means 20, typically comprises three relays and a timer relay (not shown). Ignition master switch 28 connects the battery voltage to a first relay and to the timer relay. Switch 28 also connects battery voltage to an optional override switch, which may be located on the dashboard, and to backpressure limit switch 53, which is located in conduit 18. A dash-mounted backpressure warning light, which is connected to switch 53, signals the activation of that switch. When closed, switch 53 connects the battery voltage to the terminals of the first relay. In its closed condition, the override switch connects the battery voltage to the bypass valve controller relay.

In order to describe the operation of the aforementioned system, it will be assumed that the system is installed on a fire truck. As soon as an alarm is sounded, the engine is started. Some minimum amount of time is required for the firemen to get ready and get on the truck. Thus, there is a minimum predetermined time period between the starting of the truck and the time that the truck leaves the fire station. If a conventional muffler exhaust system were employed on the truck, carbon particulates and the like would exhaust into the station, thus presenting a danger to those working therein. If conventional particulate catching means were permanently installed on the truck, it would become saturated after an average of twenty hours of operation. It is impracticable to replace the particulate trap every twenty hours of operation. Particulate traps having regeneration means suffer a number of disadvantages as discussed above. The system of FIGS. 2-4, as operated in the following manner, solves the aforementioned dilemma.

When the bypass filter valve 14 is in its normal deactivated state, the exhaust flows through the vehicle muffler 16, without filtration of the exhaust gasses. When bypass filter valve 14 is activated by any one of the activating means, valve 14 closes and redirects the exhaust through the particulate filter 19. Optionally, the system also includes a valve position sensor that indicates the actual valve position, whether open (i.e., in bypass mode) or closed (i.e., in filter mode). The timer relay is programmed such that, after it is activated by either the second or third relays, the bypass filter valve 14 is closed for the predetermined time period. When starter switch 30 is closed, current supplied to normally open second relay closes the second relay. The second relay closes, thereby activating the timer relay. The normally open timer relay closes, and current passes through the timer relay and through the normally closed relay section of the first relay to the solenoid valves. The solenoid valves being thus activated, air cylinder plunger rod 21 retracts, placing exhaust changeover valve 14 in its activated condition. The exhaust system is placed in the filter mode whereby exhaust gas is diverted through particulate filter 19. When starter switch 30 opens, the second relay is disconnected, thus starting the predetermined period of time during which the timer relay terminals are connected. At the end of said predetermined time period, the timer relay opens, thereby deactivating the solenoid valves. The plunger of air cylinder 35 returns to its normal position, and valve 14 returns to the position shown in FIG. 2. The particulate-containing exhaust gas again passes through muffler 16 to the atmosphere. By this time, however, the truck has left the station.

When the fire truck backs into the fire station, it could again subject personnel working therein to particulate-containing exhaust gases. However, when the vehicle is placed in reverse, backup light switch 26 closes and activates the third relay. This normally open relay closes, thereby closing the timer relay, and causes current to pass through the first relay, as described above, to activate the solenoid valves and place the exhaust system in the filter mode. When the transmission is shifted out of reverse, switch 26 opens and the timer clock in the relay begins to run. The exhaust system then remains in the filtered position for the predetermined period of time. This gives some time during which the transmission may be placed in neutral or park position in case the engine is not immediately turned off.

The override switch places the exhaust system in the filter mode at any time by overriding the timer relay. When closed, it connects the battery voltage directly to the first relay. The switch may be located on the dashboard, the control box housing the relays or in any other remote location. The switch may be employed, for example, if the truck drives up to the garage and pulls in forward. As soon as the driver begins to pull into the garage, he closes the switch.

Particulate filter 19 accumulates relatively little particulate material per hour of total operating time. However, the filter eventually accumulates enough particulate to create a sufficient backpressure in the vehicle exhaust system to close switch 53. The resultant flow of current causes the normally open section of the first relay to close. This allows current to flow to apply a hold current to the relay, after the backpressure limit switch 53 opens due to a reduction in back pressure. The normally closed section of the first relay opens, thereby placing the exhaust system in bypass mode, regardless of the condition of the second and third relays. Since it is only infrequently that filter 19 accumulates sufficient particulate to actuate backpressure limit switch 53, the replacement of full traps is no longer impracticable. After the actuated backpressure warning light is observed, arrangements are made to have the particulate filter replaced. In the embodiment shown in FIG. 2, this is accomplished by opening clamps 58 which are located at the outlet end of the casing of filter 19. After end portion 59 and tailpipe 60 are removed, the filter means is removed from the casing. A new or cleaned filter means is inserted, and elements 59 and 60 are reattached.

Various modifications can be made to the described embodiment without departing from the scope of the invention. For example, the override switch may be a pushbutton switch that momentarily closes and then opens when released. Such an override switch could be employed to activate the timer relay so that the valve means is activated for the predetermined time after the switch is operated. The vehicle operator would merely touch the pushbutton switch as the vehicle begins to pull into a garage. The exhaust system would be in the filter mode for the predetermined time, which would be of sufficient length to permit the vehicle to be parked and the engine turned off.

Figure 3B:
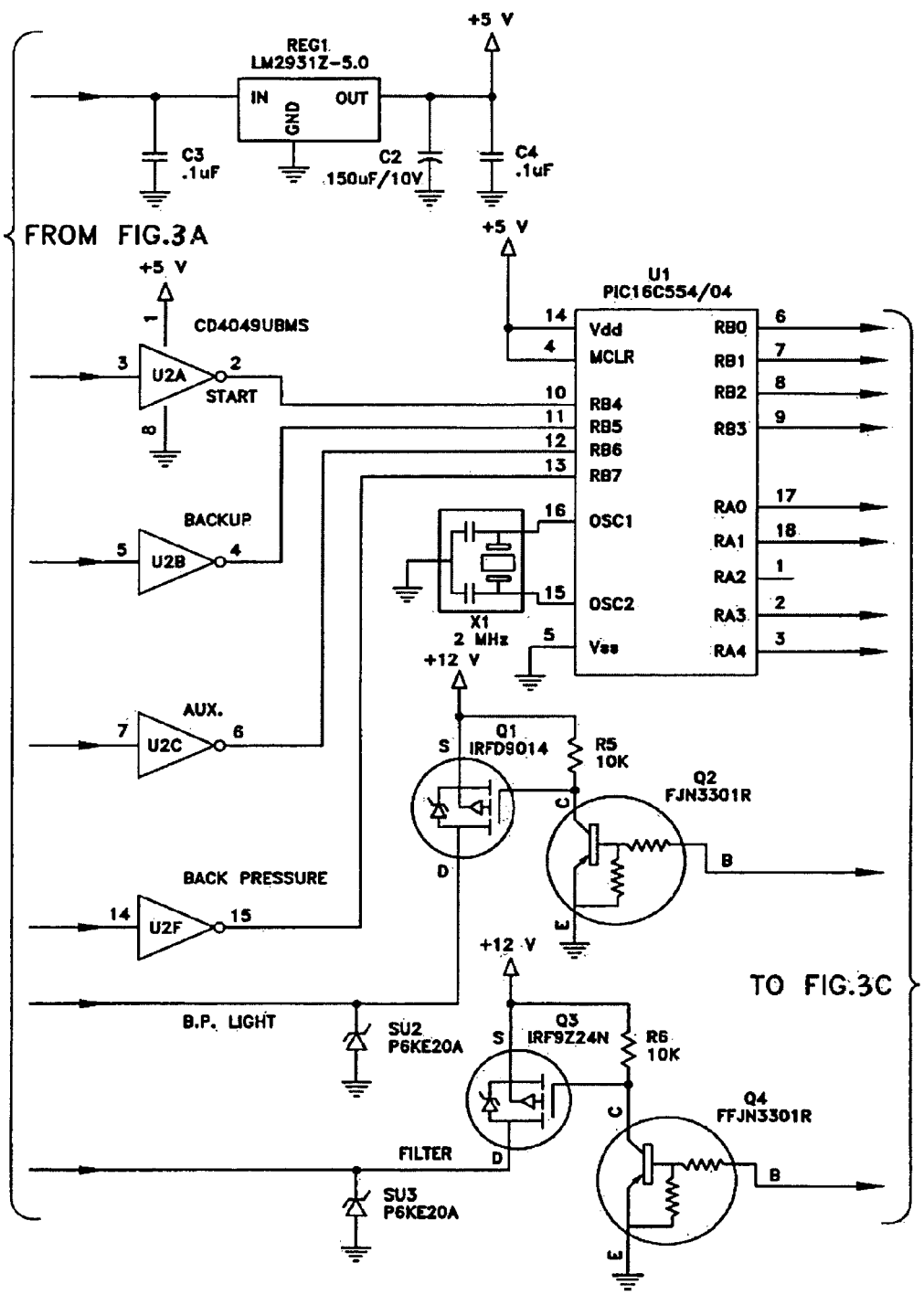
Figure 3C:
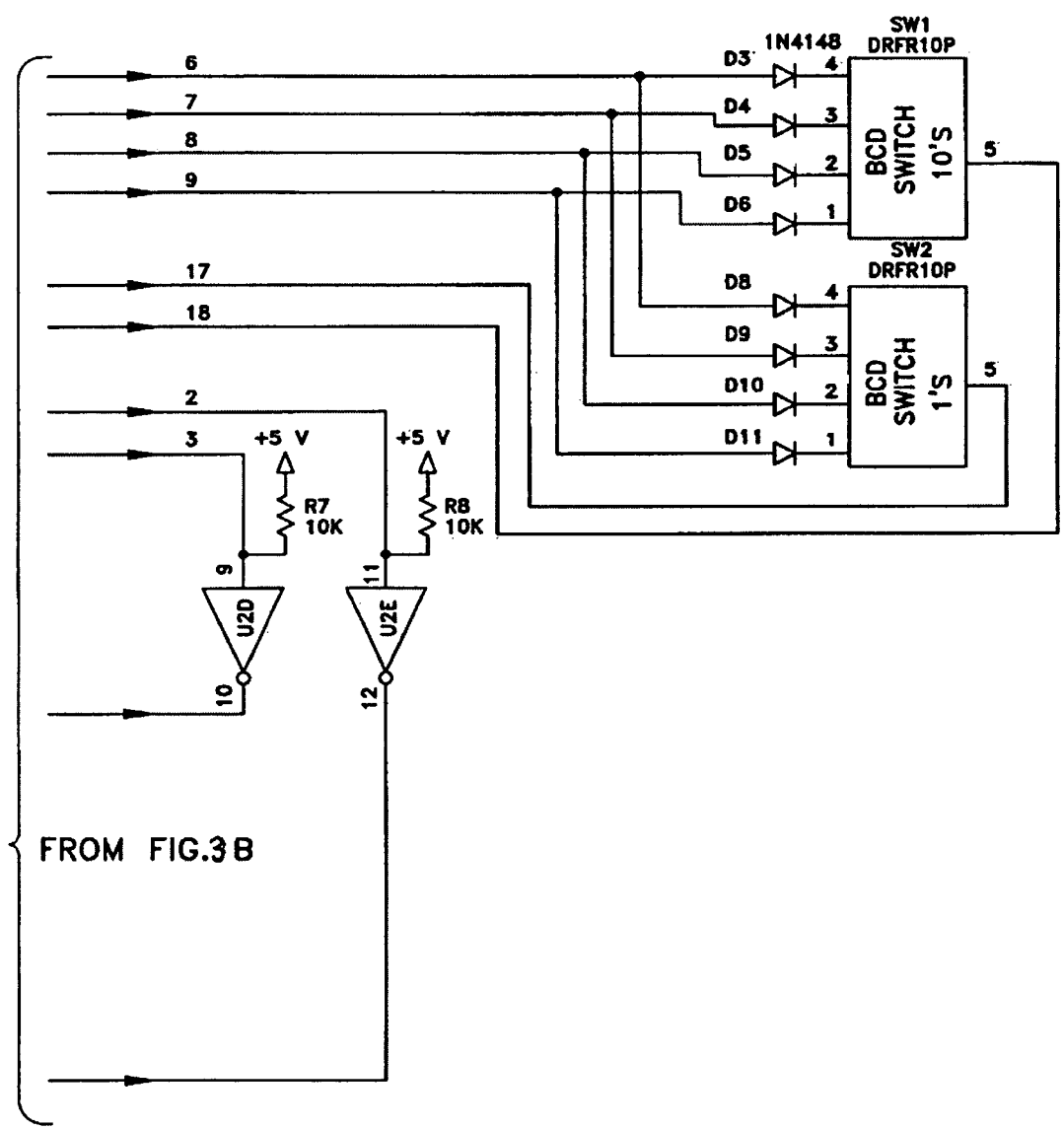

Referring now to FIGS. 2-3, an embodiment of an improved exhaust particle filtration electrical control system is shown, according to the present invention. The improved electrical control system comprises a locking integrated circuit device 100, the output of which controls valve activating means 20, which in this embodiment comprises a filter solenoid 120. The locking integrated circuit device 100 includes valve locking circuit means and a pair of operatively connected BCD switches 110 and 111. The operatively connected circuits include the backup light switch 126, the ignition master switch 128, the starter switch 130, the auxiliary (override) switch 152, the back pressure limit switch 153 and the back pressure warning light 154. Although the electrical control system in this embodiment is shown as an integrated locking circuit device, the control system optionally can be any type of suitable electrical control apparatus, such as a solid state circuit board or a printed circuit board.

In the preferred embodiment, the valve activating means can be disabled by backpressure limit switch means 153, which detects the backpressure in the exhaust system. In this embodiment, an exhaust pressure sensor monitors the exhaust backpressure, and the circuit means responsive to the exhaust pressure sensing means 153 maintains the valve means continuously in the non-activated condition, when the exhaust backpressure reaches a predetermined level for a predetermined period of time. Thus, this system is less prone to false indications that the filter requires service, less likely to produce unwanted soot due to by-passing the filter unnecessarily, and more reliable generally.

In another embodiment, the circuit means responsive to the exhaust pressure sensing means 153 further comprises locking means 110, 111 for disabling other system inputs that normally would activate the valve means (e.g., reverse gear), when the exhaust backpressure reaches a predetermined level for a predetermined period of time. Auxiliary (override) switch 152 further allows the filtration system to be activated or deactivated on demand. Thus, this system also is less prone to false indications that the filter requires service, less likely to produce unwanted soot due to by-passing the filter unnecessarily, and more reliable, as the life of the filter element can be extended.

When the engine is started, a backpressure sensor monitors the backpressure in the exhaust. If exhaust pressure above the predetermined level is detected continuously for longer than the predetermined time, then the filter solenoid is closed, diverting the exhaust from the filter, and locking out the other inputs that normally would activate the filter solenoid. The system remains locked until manually overridden or until the engine is restarted. Experimental data have shown that the preferred period of time before locking the filter solenoid is at least four seconds, and the preferred level of pressure is from about 1.5-1.8 psig. In the preferred embodiment, once the filter backpressure reaches 1.5 psig, the backpressure warning light begins to blink, and upon reaching 1.8 psig for at least four seconds, the backpressure warning light stops blinking and stays lit. The constantly lit warning light thus provides a continual reminder that the filter requires service.

One problem, however, is that the vehicle operators generally do not have any indication of the status of the filter, i.e., the amount of particulate loading, until the backpressure warning light is continually lit, at which time immediate service is required to exchange the filter. Thus, drivers do not know what the backpressure level is and have no indication of the remaining filter life before service is required: the filter could have no particulates in it, or the filter could be almost completely clogged with particulates, nearing the point of constant warning light condition. Therefore, in another embodiment, an alternative means for indicating the filter medium loading status comprises a backpressure gauge for providing a real time pressure reading, such as, for example, a vehicle dash-mounted gauge. This feature provides vehicle operators a reliable indication of remaining filter life. In one example, a zero position on the gauge indicates backpressure when the filter is new, and a red zone indicates backpressure when the filter requires replacement, and optional in-between zones are green for good, and yellow for warning (i.e., time to order replacement).

In another alternative embodiment, a second "auxiliary", preferably compact size filter (e.g., good for only a few hours of additional filter time) is arranged in parallel relative to the first (main) filter. The secondary filter preferably is compact, to save space (that may not be available), but optionally can be any size. The purpose of this secondary filter is to provide back-up service for the primary filter, when it becomes clogged. Thus, vehicle operators have an opportunity to order a new primary filter (and a new secondary filter), while the vehicle exhaust is filtered through the secondary compact filter. In the event that the secondary filter becomes clogged as well, then the vehicle exhaust is directed to the atmosphere without filtering. As is described for the primary (main) filter, the auxiliary filter optionally includes exhaust pressure sensing means for monitoring the secondary (auxiliary) filter exhaust backpressure, operatively connected to means for indicating the filter medium loading status of the secondary filter.

In one embodiment, for trucks equipped with a secondary filter, a steady (i.e., continuously lit) backpressure warning light indicates that the primary filter is clogged and the exhaust is in secondary filter mode. A steady blinking (i.e., continuously blinking on and off) light indicates both filters are clogged, and the exhaust is being directed to the atmosphere without filtration. In vehicles without a secondary (auxiliary) filter system, a steady (continuously lit) backpressure warning light indicates that the filter is clogged, and the exhaust is being directed to the atmosphere without filtration.

Numerous other variations of the aforementioned means for indicating the filter loading status will be apparent to those skilled in the art. In one example, a plurality of backpressure warning lights are progressively activated as the exhaust backpressure increases above corresponding predetermined levels. The multiple lights optionally are different colors, such as, for example, green, yellow, orange and red. When the backpressure is effectively zero (new filter) the green light is illuminated, and as the backpressure increases the yellow, orange, and red (clogged) lights are successively illuminated, according to the backpressure. Other variations are contemplated, such as, for example, various different combinations of blinking times, frequencies and/or patterns, or varying light intensity (e.g., progressively increasing brightness with increasing backpressure).

Figure 4:
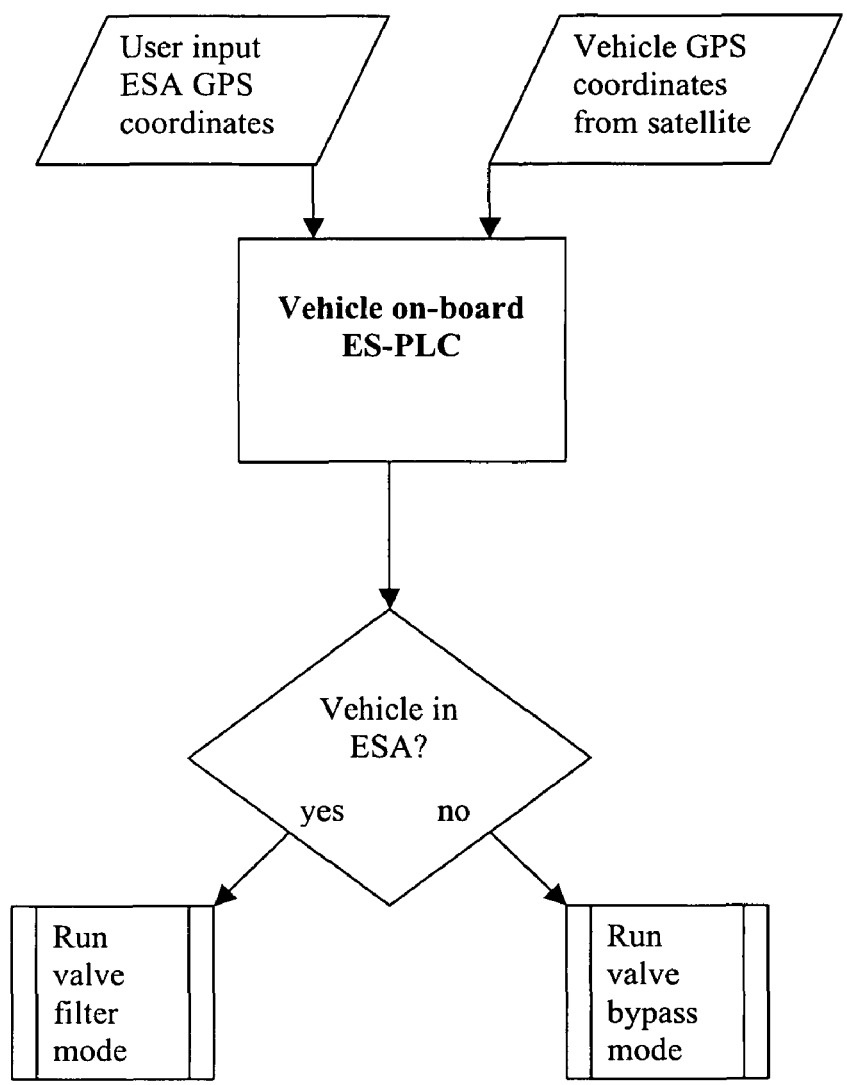
FIG. 4 shows a flow chart depicting an alternative embodiment, wherein the valve means is automatically activated based on GPS coordinates that define Exhaust Sensitive Areas (ESA), in accordance with the present invention.

Referring now to FIG. 4, a flow chart is shown, depicting another alternative embodiment, wherein GPS coordinates of Exhaust Sensitive Areas (ESA) are provided, such as, for example, by local officials or other public or private sources, for input into the vehicle's on-board Exhaust System Programmable Logic Controller (ES-PLC). The GPS coordinates of the desired ESAs are programmed into the ES-PLC and, when a GPS navigation system equipped vehicle comes within a predetermined distance of an identified ESA, the ES-PLC sends a signal to activate the valve and divert the exhaust from bypass to filter mode. The GPS system logic optionally operates alone or in conjunction with the standard logic (i.e., reverse, startup, manual, etc.). Note, however, that use of the GPS control option can eliminate the need for startup and reverse activation functions, as a firehouse normally would be an ESA, which would thus dictate filter mode automatically. Likewise, upon vehicle shutdown, the diverter valve preferably defaults to filter mode, so that on startup the system is already in filter mode. For drive-through bays, there would be no need for manual engagement of the exhaust filtration system, as the ESA coordinates would call for automatic filter mode based on GPS data. The GPS control option also works acceptably with filter condition technology, and primary/secondary filter technology without interference. There is no need for transmitters and receivers and the system is easily modified and user friendly.

The speed of transition from bypass to filter mode is critical to engine protection. Therefore, various inputs, such as, for example, vehicle speed, engine RPM, distance to ESA, buffer zone around specified ESA, etc., optionally are used to dictate when to start the diverter valve and how fast the transition from bypass to filter mode occurs. Diverter valve transition optionally is controlled by a servo motor in order to handle engine backpressure. Other options include a GPS navigation system having means for verbally (or otherwise) notifying the vehicle operator of ESA proximity and diverter valve status, as well as filter condition and/or any other information desired. An example status report is as follows: "Approaching ESA in 100 yards, transitioning to filter mode", then "Now in Filter Mode", then "Transitioning to bypass mode", then "Now in bypass mode". Other notifications optionally include "GPS system down" (standard system would override in this case) and many other possibilities. Upon the vehicle leaving the ESA, the ES-PLC automatically diverts the exhaust back to bypass mode.

In the event that the GPS system malfunctions (e.g., satellite issues), the filtration system may revert to the standard (i.e., non-GPS-activated) system. The coordinates that are entered as exhaust-free areas optionally can further be assigned various other factors that would, for example, describe the size of the area or the distance from the area that the exhaust should go into filter mode. For example, an entry of "1" along with the coordinate could indicate a 500' radius about that point. An entry of "2" could indicate 1000', etc. Codes also can be entered that indicate the shape of the zone, the size of the zone, etc. The entered coordinate could be the center of that shape (square or circle or easiest). The on-board logic center can determine the perimeter of the zone based on the above inputs. Using a wireless communication system on the truck itself would further integrate the system and also would save in installation costs. For example, valve activating solenoids optionally could include wireless relays that communicate with the filtration system control board in the vehicle cab.

It must further be understood that the architectural and operational embodiments described herein are exemplary of a plurality of possible arrangements to provide the same (or equivalent) general features, characteristics, and general system operation. Therefore, while there have been described the currently preferred embodiments of the present invention, those skilled in the art will recognize that other and further modifications may be made, without departing from the spirit of the present invention, and it is intended to claim all modifications and variations as fall within the scope of the appended claims.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A system for removing particulates from exhaust gas of a vehicle internal combustion engine, comprising:
    first gas flow means connected to an exhaust of said engine;
    valve means connected to said first gas flow means for normally directing exhaust to a first output, when in a non-activated or deactivated condition, and for directing exhaust to a second output, when in an activated condition;
    second gas flow means connected to said valve means first output for exhausting particulate-containing exhaust to the atmosphere;
    third gas flow means connected to said valve means second output for removing exhaust gas particulates before delivering said exhaust gas to the atmosphere;
    means responsive to starting of said engine for activating said valve means for a predetermined period of time;
    exhaust pressure sensing means for monitoring exhaust backpressure, said sensing means operatively connected to means for indicating the filter medium loading status of said exhaust gas particulate removing means;
    circuit means responsive to said exhaust pressure sensing means for maintaining said valve means continuously in said non-activated condition, when said exhaust backpressure reaches a predetermined level for a predetermined period of time;
    locking means for disabling other system inputs that normally would activate said valve means, when said exhaust backpressure reaches said predetermined level for said predetermined period of time; and
    further comprising means for receiving and storing GPS coordinates of one or more exhaust sensitive areas and activating said valve means when said vehicle comes within a predetermined distance of said exhaust sensitive area(s).

2. The system of claim 1, further comprising means for a user to input GPS coordinates of one or more exhaust sensitive areas.

3. The system of claim 1, wherein said system provides filter condition status information to a user of said system.

4. The system of claim 1, wherein a rate of opening or closing said valve means is variable based on GPS data.

5. The system of claim 1, wherein said circuit means comprises a semi-conductor device, integrated circuit or circuit board.

6. The system of claim 1, wherein said circuit means maintains said valve means continuously in said non-activated condition and continuously illuminates said backpressure warning light, when said exhaust backpressure remains above a predetermined level continuously for at least four seconds.

7. The system of claim 6, wherein said exhaust backpressure level is from about 1.5 to about 1.8 PSI.

8. A system for removing particulates from exhaust gas of a vehicle internal combustion engine, comprising:
    first gas flow means connected to an exhaust of said engine;
    valve means connected to said first gas flow means for normally directing exhaust to a first output, when in a non-activated or deactivated condition, and for directing exhaust to a second output, when in an activated condition;
    second gas flow means connected to said valve means first output for exhausting particulate-containing exhaust to the atmosphere;
    third gas flow means connected to said valve means second output for removing exhaust gas particulates before delivering said exhaust gas to the atmosphere; and
    means for receiving and storing GPS coordinates of one or more exhaust sensitive areas and activating said valve means when said vehicle comes within a predetermined distance of said exhaust sensitive area(s).

9. A method for removing particulates from exhaust gas of a vehicle internal combustion engine, comprising the steps of:
    a) providing first gas flow means connected to an exhaust of said engine;
    b) providing valve means connected to said first gas flow means for normally directing exhaust to a first output, when in a non-activated or deactivated condition and for directing exhaust to a second output, when in an activated condition;
    c) providing second gas flow means connected to said valve means first output for exhausting particulate-containing exhaust to the atmosphere;

d) providing third gas flow means connected to said valve means second output for removing exhaust gas particulates before delivering said exhaust gas to the atmosphere;

e) providing means responsive to starting of said engine for activating said valve means for a predetermined period of time f) providing exhaust pressure sensing means for monitoring exhaust backpressure;

g) providing circuit means responsive to said exhaust pressure sensing means for maintaining said valve means continuously in said non-activated condition and illuminating a backpressure warning light, when said exhaust backpressure reaches a predetermined level for a predetermined period of time; and h) maintaining said valve means continuously in said non-activated condition and illuminating said backpressure warning light, when said exhaust backpressure remains above a predetermined level continuously for at least four seconds; and further comprising the step of providing GPS coordinates of one or more desired exhaust sensitive areas to a navigation system of said vehicle, and activating said valve means when said vehicle comes within a predetermined distance of said exhaust sensitive area(s).

10. The method of claim 9, further comprising the steps of:

i) providing locking means for disabling other system inputs that normally would activate said valve means, when said exhaust backpressure reaches said predetermined level for said predetermined period of time; and j) disabling said system inputs that normally would activate said valve means, when said exhaust backpressure remains above a predetermined level continuously for at least four seconds.

\* \* \* \* \*